United States Patent
Kasabach et al.

(10) Patent No.: US 6,628,847 B1
(45) Date of Patent: Sep. 30, 2003

(54) METHOD AND APPARATUS FOR RECOGNITION OF WRITING, FOR REMOTE COMMUNICATION, AND FOR USER DEFINED INPUT TEMPLATES

(75) Inventors: Chris Dominick Kasabach, Pittsburgh, PA (US); John Michael Stivoric, Pittsburgh, PA (US); Francine Duskey Gemperle, Chicago, IL (US); Christopher Pacione, Pittsburgh, PA (US); Eric Teller, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 10/146,243

(22) Filed: May 15, 2002

Related U.S. Application Data

(62) Division of application No. 09/258,560, filed on Feb. 26, 1999, now Pat. No. 6,456,749.
(60) Provisional application No. 60/076,338, filed on Feb. 27, 1998.

(51) Int. Cl.$^7$ .................................................. G06K 9/22
(52) U.S. Cl. ......................... 382/314; 358/473; 382/188
(58) Field of Search ................................ 382/312–314, 382/317, 321, 119–123, 186–189, 291; 358/473, 478; 345/158, 162, 179, 704, 762, 866; 356/614, 623

(56) References Cited

U.S. PATENT DOCUMENTS

| | | | |
|---|---|---|---|
| 5,198,877 A | | 3/1993 | Schulz |
| 5,234,345 A | | 8/1993 | Weinblatt |
| 5,518,008 A | | 5/1996 | Cucchiaro et al. |
| 5,561,446 A | * | 10/1996 | Montlick ..................... 345/173 |
| 5,596,698 A | * | 1/1997 | Morgan ....................... 345/863 |
| 5,649,023 A | * | 7/1997 | Barbara et al. ............. 382/159 |
| 5,666,214 A | * | 9/1997 | MacKinlay et al. ........ 358/453 |
| 6,081,261 A | | 6/2000 | Wolff et al. |
| 6,127,928 A | | 10/2000 | Issacman et al. |
| 6,130,666 A | | 10/2000 | Persidsky |
| 6,298,173 B1 | * | 10/2001 | Lopresti ....................... 382/305 |

FOREIGN PATENT DOCUMENTS

| | | | |
|---|---|---|---|
| EP | 0442208 A2 | 8/1991 | ............ G07C/9/00 |
| EP | 0622754 A1 | 11/1994 | ............ G06K/11/16 |
| EP | 0418537 B1 | 5/1995 | ............ G07C/9/00 |
| EP | 0507269 B1 | 8/1995 | ............ G06F/3/033 |
| EP | 0843278 A2 | 5/1998 | ............ G06K/11/16 |

* cited by examiner

*Primary Examiner*—Timothy M. Johnson
(74) *Attorney, Agent, or Firm*—Kirkpatrick & Lockhart LLP

(57) ABSTRACT

A device including a housing, a writing tip connected to the housing, a writing surface position indicator, a processor in the housing, a memory device in the housing connected to the processor, and a sensor in the housing and cooperative with the writing surface position indicator. The device may be used to record writings and drawings applied to a surface by a user, to transmit that data to a remote device, to download data from remote devices, and to otherwise communicate with remote devices.

31 Claims, 7 Drawing Sheets

METHOD AND APPARATUS FOR RECOGNITION OF WRITING, FOR REMOTE COMMUNICATION, AND FOR USER DEFINED INPUT TEMPLATES

CROSS REFERENCE TO RELATED APPLICATIONS

This is a divisional application of U.S. patent application Ser. No. 09/258,560, filed on Feb. 26, 1999, now U.S. Pat. No. 6,456,749, which claims priority from provisional U.S. patent application Ser. No. 60/076,338, filed Feb. 27, 1998.

STATEMENT REGARDING FEDERALLY SPONSORED RESEARCH OR DEVELOPMENT

Not Applicable.

BACKGROUND OF THE INVENTION

1. Field of the Invention

The present invention is directed generally to a method and device for recognition of writing and communication with remote devices.

2. Description of the Background

The use of computers for data entry and communication has become limiting and inconvenient in some aspects. For example, the use of a computer keyboard requires repetitive motion that is known to cause physical discomfort and, in some cases, physical injury. In addition, computers are relatively large devices. Even the advent of laptop computers has not made data entry and communication easy. One reason is that a laptop cannot be smaller than a keyboard and, to be efficient, a keyboard must have keys at least as large as a typical user's fingers. As a result, the size of a laptop computer is not foreseen to reduce significantly in the future. In any event, it is not foreseen to become small enough to be carried by a person with little or no inconvenience.

To address these problems, some relevant art discloses hand-held devices for data entry, typically in the form of handwriting recognition. Many of those devices, however, require a written or sensory grid in order to determine the motion of the device and read the lines drawn by a user. Some devices require special purpose input pads to monitor the writing and drawing of a user. Other devices require that a user only print using special characters in order for handwriting recognition to work. All of those devices also suffer the inability to monitor multiple writings by a user on an ordinary piece of paper. Other devices allow for multiple writings on an ordinary piece of paper, but do not compensate for movement of the paper relative to the writing instrument. Thus, the prior art devices inaccurately recognize the writings because the user compensates for the movement of the paper, but the device is not able to determine that user has so compensated.

As a result, the need exists for a device that provides for easy and convenient data entry and communication, as well as the ability to use any surface and to be able to accurately monitor a user's actions.

BRIEF SUMMARY OF THE INVENTION

The present invention is directed to a device including a housing, a writing tip connected to the housing, a writing surface position indicator, a processor in the housing, a memory device in the housing connected to the processor, and a sensor in the housing and cooperative with the writing surface position indicator. The device may be used to record writings and drawings applied to the surface by the user, to transmit that data to a remote device, to download data from remote devices, and to otherwise communicate with remote devices.

The present invention is also directed to a device including a housing, writing tip connected to the housing, a processor in the housing, and a memory device in the housing connected to the processor having stored thereon instructions which when executed by the processor cause the processor to recognize an interface defined by writing on a writing surface.

The present invention provides the advantage in that it permits data entry with a hand-held device which does not require a special writing surface. The present invention also provides the advantage that data can be entered accurately because the device compensates for movement of the writing surface during the writing process. The present invention also provides the advantage that the data can be stored into the writing instrument itself, rather than having to transmit the data to a remote device. The present invention also provides the advantage that the device can communicate with remote devices. The present invention also provides the advantage that a user can define a personal interface, which can be stored by the device, to enter data or instruct the device to perform certain commands. These and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements. Those of ordinary skill in the art will recognize that other elements may be desirable in order to implement a particular embodiment of the present invention. However, because such elements are well known in the art, and because they do not facilitate a better understanding of the present invention, a discussion of such elements is not provided herein.

Figure 1:
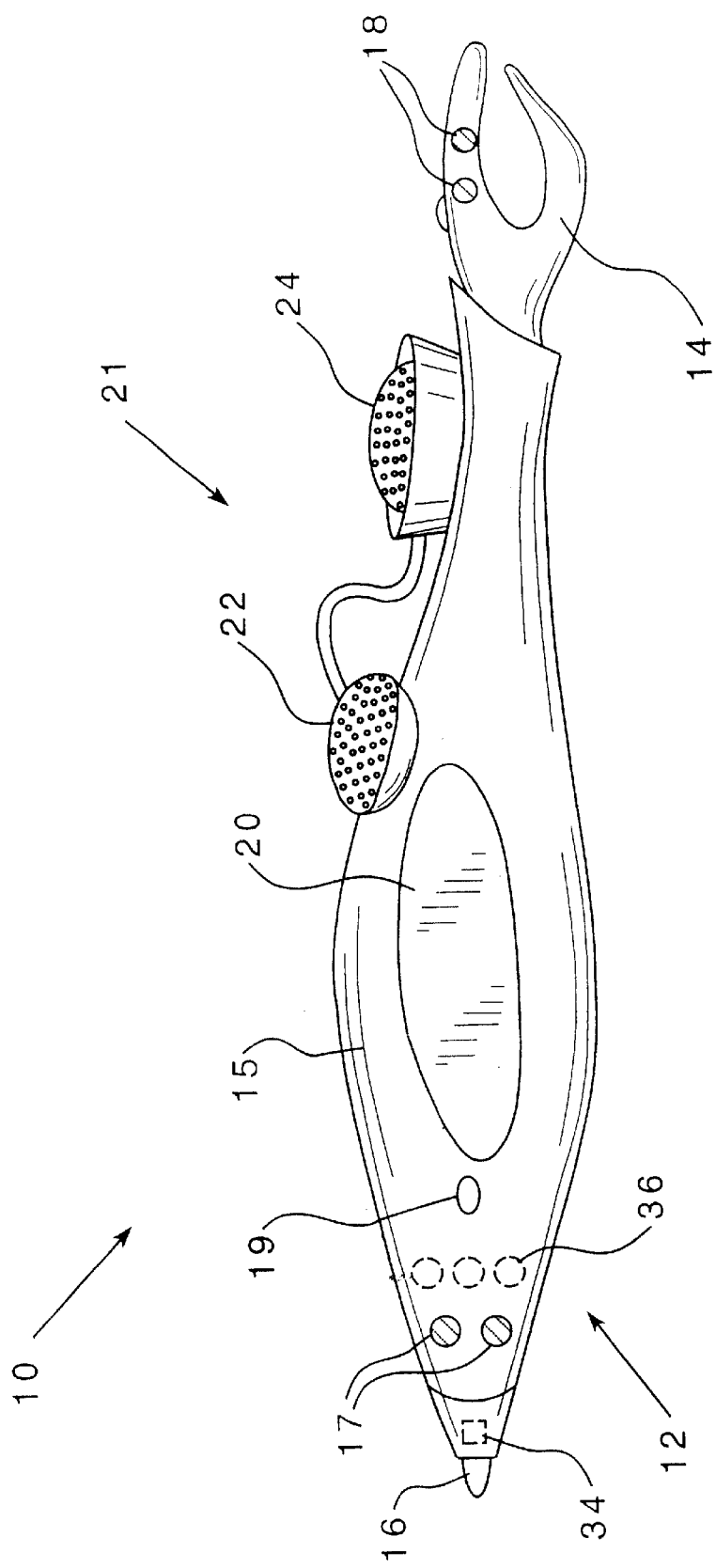
FIG. 1 is a side plan view of a device constructed in accordance with the present invention.

FIG. 1 is a side plan view of a device 10 constructed in accordance with the present invention. The device 10 includes a writing instrument 12 and a writing surface position indicator 14. The writing instrument 12 may be a writing device such as, for example, a pen, a mechanical pencil, a marker, and chalk. The writing instrument 12 includes a housing 15 and a writing tip 16 connected to the housing 15 to enable a user of the device 10 to place marks on a surface by applying the writing tip 16 to any surface.

The writing surface position indicator 14 provides information indicative of the relative position of the writing tip 16 to the surface on which the user is using the writing instrument 12. The writing surface position indicator 14 communicates with the Writing instrument 12 to better determine the position of the writing tip 16 relative to the writing surface. The communication between the writing surface position indicator 14 and the writing instrument 12 helps the device 10 track the marks being applied to the writing surface, even if the surface is translated or rotated during use. The device 10 may track movement of the writing instrument 12 with a number of accelerometers 36, and periodically correct the perceived position of the writing instrument 12 with the writing surface position indicator 14, as discussed hereinbelow. Alternatively, the writing surface position indicator 14 may be used alone to determine position and movement of the writing instrument 12. To communicate the relative position of the writing tip 16 to the surface, the writing surface position indicator 14 is affixed to or engaged with the writing surface and transmits a signal to one or more sensors 17 in the housing 15. For example, the writing surface position indicator 14 may be a clip fastenable to an edge or corner of a writing surface. When the writing surface position indicator 14 is not being used to provide information indicative of the relative position of the writing tip 16 to the writing surface, it may be fastened to the writing instrument 12. For example, the writing surface position indicator 14 may be fastened to an end of the writing instrument 12 opposite the writing tip 16, such as is illustrated in FIG. 1. Further, the writing surface position indicator 14 may be fastened to the end of the writing instrument 12 to protect the writing tip 16 when the device 10 is not in use.

In one embodiment, the writing surface position indicator 14 may be a clip, such as on a clipboard, for holding the writing surface. In another embodiment, the writing surface position indicator 14 may be, for example, a sticker fastenable to the writing surface. In another embodiment, the writing surface position indicator 14 may be placed on the writing surface and have sufficient mass, such as a paper weight, to maintain a constant position relative to the writing surface even if the writing surface is translated or rotated during writing.

In addition, the writing surface position indicator 14 may be active or passive. For example, the writing surface position indicator 14 may include a number of transmitters 18 to transmit a signal to the sensor 17 in the writing instrument 12. The device 10 determines the relative position of the writing tip 16 based on the received signal, as further described hereinbelow. Alternatively, the writing surface position indicator 14 may be passive, such as by utilizing magnetic components. For example, the writing surface position indicator 14 may be a magnetic substance, such as magnetic ink applied to the surface or a magnetic sticker fixably placed on the writing surface. In an embodiment in which the writing surface position indicator 14 is passive, the sensor 17 detects the position and orientation of the writing surface position indicator 14, such as by sensing a magnetic field generated by the writing surface position indicator 14, to determine the relative position of the writing tip 16.

The device 10 may also include one or more other features to facilitate its use. For example, the device 10 may include an input 19, such as a push button, to allow the user to select from various modes of operation and functions to be performed by the device 10, as further described hereinbelow. The device 10 may also include a display 20, such as a liquid crystal display, for providing a user with visual information, including information regarding user input (feedback). The display 20 may also, for example, serially display received and sent information, such as e-mail messages. In addition, a facsimile message may be received by the device 10, for example, by converting the facsimile message into electronic form and displaying it on the display 20, much like an e-mail message.

The device 10 may further include an audio interface system 21, including a speaker 22 and a microphone 24. The audio interface 21 may be detachably connectable to the housing 15. When the audio interface 21 is connected to the housing 15, it may allow the device 10 to provide conventional telephony communications using, for example, cellular technology contained within the housing 15, as discussed hereinbelow. In addition, the device 10 may, for example, be programmed to record audio dictation, to translate audio input into text to send via e-mail, or to convert the text of a received e-mail message into audio output. Also, the audio interface system 21 may provide an audio signal when an e-mail message is received by the device 10.

Figure 2:
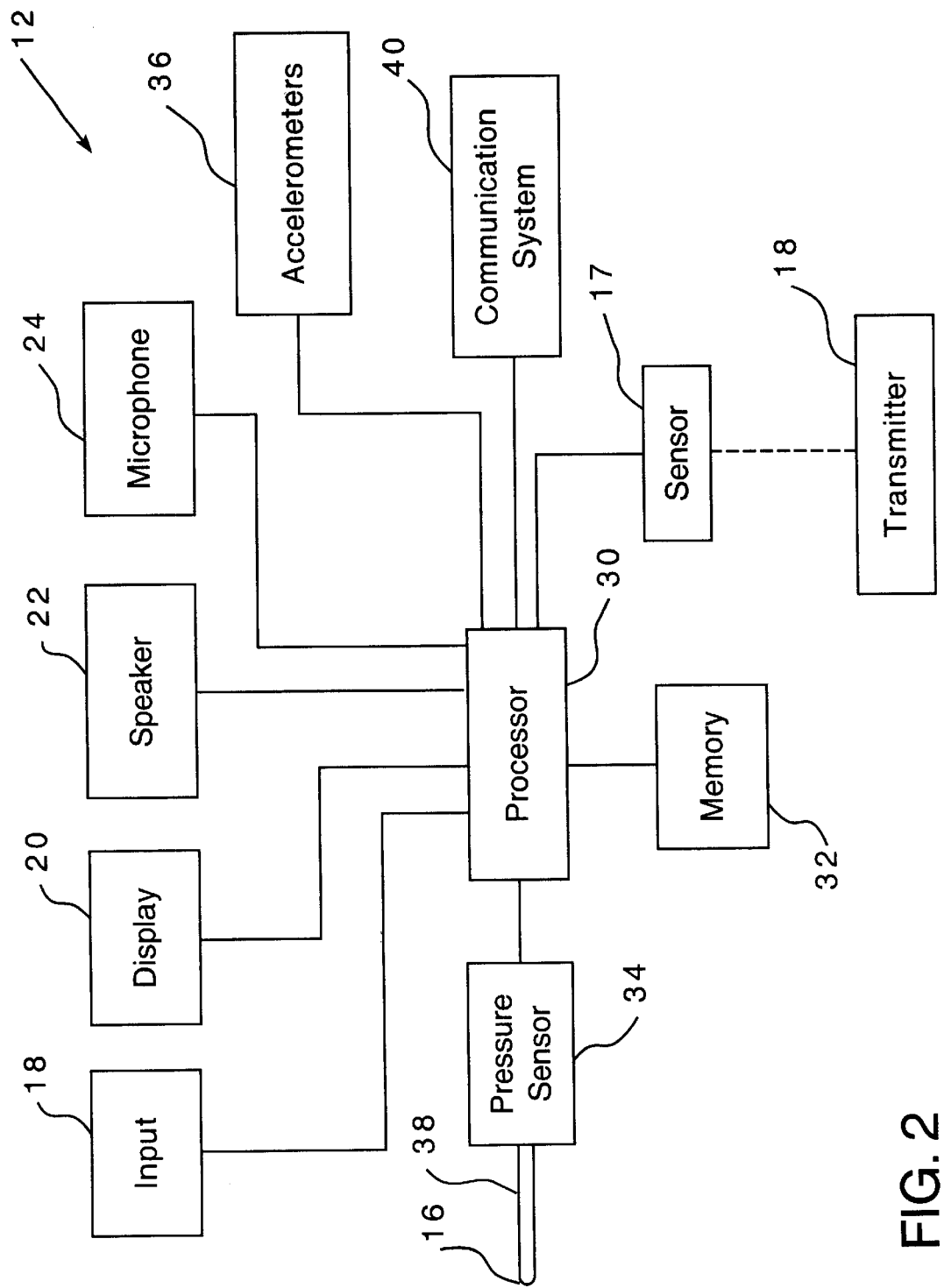
FIG. 2 is a block diagram illustrating components of the device.

FIG. 2 is a block diagram illustrating one embodiment of the device 10 including a processor 30. The processor 30 may be any one of many processors, such as one of the Pentium® family of processors manufactured by Intel Corp., Santa Clara, Calif. A memory device 32 is coupled to the processor 30, and may be used to store instructions for the operation of the device 10, as well as to store data collected by the device 10. The memory device 32 may be, for example, 10 Mbytes of solid state memory. The memory device 32 may be volatile or non-volatile. The memory device 32 may include ROM for storing instructions to be executed by the processor 30. The memory device 32 may include RAM, such as dynamic RAM or static RAM, for storing instructions and data. The memory device 32 may be or include an EPROM for storing instructions and data.

The device 10 may track the movement of the writing tip 16 relative to the writing surface with the writing surface position indicator 14 in conjunction with the pressure sensor 34 and accelerometers 36. For example, one pressure sensor 34 may be connected to and located near the writing tip 16 of the writing instrument 12. Alternatively, the pressure sensor 34 may be located along or at the end of a shaft 38 connected to the writing tip 16. The pressure sensor 34 allows the device 10 to determine when the writing tip 16 is against a writing surface and the force with which the writing tip 16 is being applied to the writing surface, thereby allowing the device 10 to determine when the user is writing as well as the fineness or thickness of a line being drawn. The pressure sensor 34 may be, for example, a strain gauge based force sensor.

Movement of the writing instrument 12 may be determined from the accelerometers 36, which may be connected to the shaft 38. Each accelerometers 36 may be, for example, a dual axis, micro-electromechanical accelerometer. Three accelerometers 36 may be used, as illustrated in FIG. 1, so that collectively they provide data indicative of motion, including speed and direction, of the writing instrument 12 in all three planes of three dimensional space. In an alternative embodiment, three additional accelerometers 36 may be employed to provide data indicative of roll, pitch, and yaw. Information relating to roll, pitch, and yaw of the writing instrument 12 during the writing operation may provide for better handwriting recognition because information relating to rotation of the writing instrument 12 about a particular point is obtained. Alternatively, the present invention may only utilize two accelerometers 36 to determine movement on the writing surface, and the pressure sensor 34 alone is used to determine when the writing instrument 12 is engaging the writing surface.

Used in conjunction with the pressure sensor 34 and accelerometers 36, the writing surface position indicator 14 facilitates determining the position of the writing tip 16 relative to the writing surface, even if the writing surface moves during use, such as is often the case during writing. Furthermore, the writing surface position indicator 14 may be used by the device 10 to periodically calibrate the position of the writing tip 16 relative to surface as determined by the accelerometers 36 to compensate for the error in the position determined thereby, which typically accumulates over time.

In an alternative embodiment, the writing surface position indicator 14 may alone be used to track the movement of the writing instrument 12. In that embodiment, the writing surface position indicator 14 continually determines the position of the writing tip 16 relative to the writing surface in three dimensions, thus enabling the device 10 to determine when the writing tip 16 is in contact with the surface, and the movement of the writing tip 16 as it is applied to the surface. The writing surface position indicator 14 communicates the information to the writing instrument 12 as described hereinbelow.

The memory device 32 may be programmed with instructions which when executed by the processor 30 cause the processor 30 to recognize handwriting using conventional handwriting recognition algorithms. The memory device 32 may also be programmed to cause the processor 30 to record in the memory device 32 non-recognized writings, such as drawings and doodles written by the user.

A communication system 40 may also be provided so that the device 10 may engage in external communication. For example, cellular telecommunication technology, such as PCS digital cellular technology, may be contained in the writing instrument 12, and used to allow the device 10 to send and receive information. The communication system 40 may be used, for example, to allow a user to use the device 10 as a telephone, with the aid of the audio interface system 21. The communication system 40 may also allow a user to connect to the Internet, via an internal modem and Internet connection (not shown), so that the device 10 may, for example, receive and send e-mail.

Figure 3:
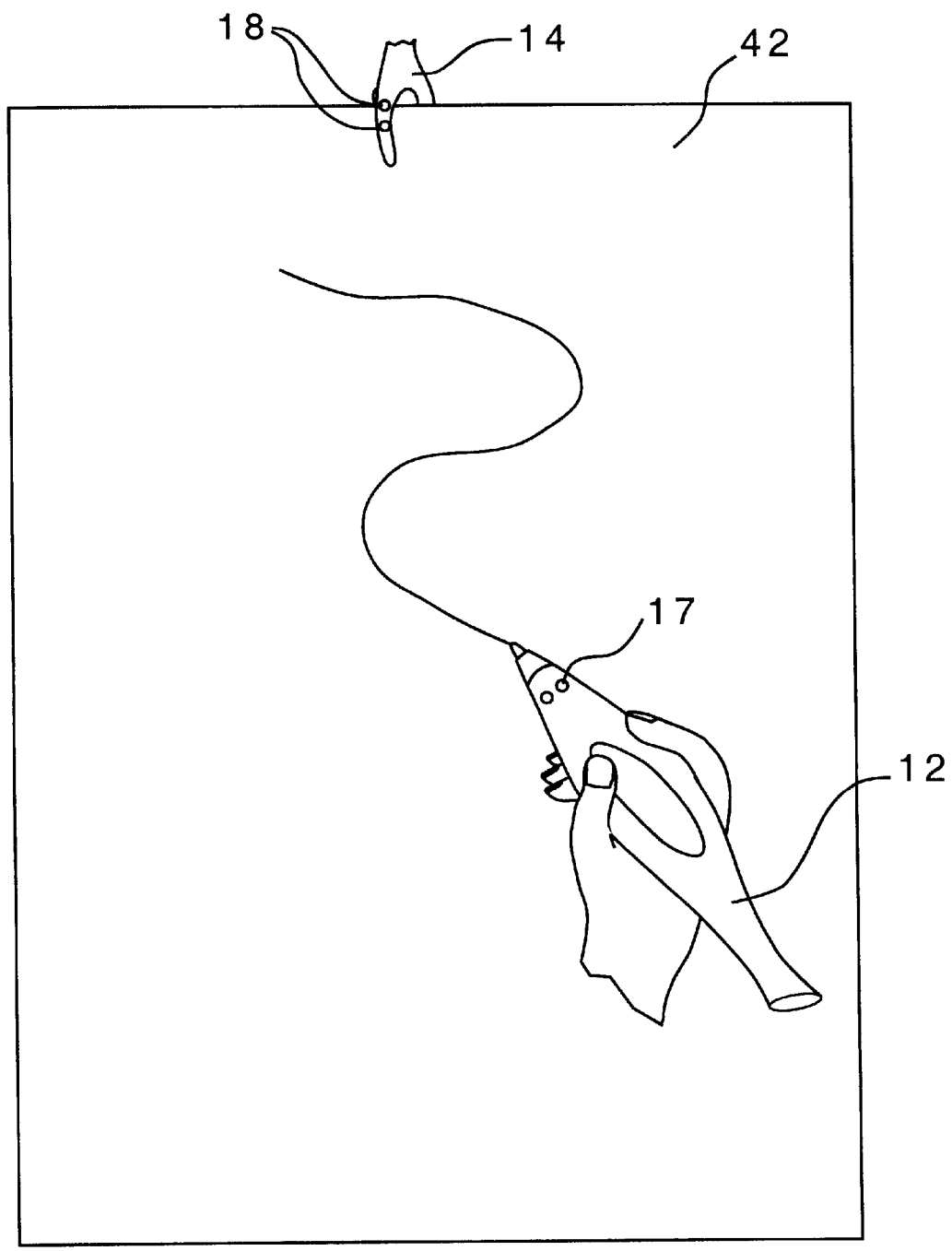
FIG. 3 is a top plan view of the device being used to write on a piece of paper.

FIG. 3 is a top plan view of the device 10 being used to write on a piece of paper 42. The writing instrument 12 may be used to write on the paper 42 in a conventional manner by applying the writing tip 16 to the paper 42. In the embodiment of the present invention illustrated in FIG. 3, the writing surface position indicator 14 is a clip fastenable to an edge of the paper 42. According to that embodiment, the writing surface position indicator 14 may be removed from the writing instrument 12 and clipped, or otherwise fastened, to the paper 42. An embodiment of the writing surface position indicator 14 includes its own power supply, such as a rechargeable Lithium-ion solid polymer or liquid gel battery. The writing surface position indicator 14 may communicate one or more signals that are used by the device 10 to determine the relative position of the writing tip 16. The signals may be, for example, infrared signals, ultrasonic signals, or electromagnetic signals. The signals from the writing surface position indicator 14 are received by the sensor 17, which may be, for example, a receiver as through part of the communication system 40 (illustrated in FIG. 2).

The device 10 may use the signals communicated by the writing surface position indicator 14 in any of several ways. For example, the signals from the writing surface position indicator 14 may be used to provide a reference for the device 10 of the relative position between the writing tip 16 and the writing surface because the writing surface position indicator 14 maintains a constant position relative to the paper 42. As a result, even if the paper 42 is moved during use, as almost always happens during writing, the device 10 will be able to maintain its position relative to the paper 42, allowing the device 10 to maintain an accurate record of what is being written. The writing surface position indicator 14 also allows for periodic calibration of the device 10. For example, by maintaining a known reference point, established at the beginning of a writing session, the writing surface position indicator 14 helps the device 10 compensate for small errors in its accelerometers 36 that accumulate over time. Without this feature, the movements recorded and used by the device 10 may become unusably noisy within a few minutes of use.

In one embodiment of the present invention, the writing surface position indicator 14 has two signal transmitters 18 separated by a small distance. The writing surface position indicator 14 periodically transmits signals from the two transmitters 18 which are received by the sensor 17. The signals may be transmitted at different frequencies so that they may be distinguished. The device 10 determines the exact position of the writing instrument 12 relative resets the internal value of where the writing instrument 12 is relative to the surface (having over the past small fraction of a second been approximated by the accelerometers 36) to the value calculated based on the information provided by the writing surface position indicator 14. In this way, "creep" can be avoided. The frequency of signals transmitted by the writing surface position indicator 14 may vary depending on the accuracy required for a specific application and the accuracy of the accelerometers 36. Furthermore, the device 10 can maintain the position of the writing tip 16 relative to the paper 42 even if the paper 42 is rotated, or otherwise moved, during the writing. In an alternative embodiment, the writing surface position indicator 14 may produce a single signal from one transmitter 18, and the device 10 may sense that signal with two spaced apart sensors 17 on the writing instrument 12 (as illustrated in FIG. 1), so that the position of the writing tip 16 relative to the writing surface position indicator 14 may be determined using, for example, triangulation.

The device 10 may operate in several modes. The different modes may be selected with the input 19. For example, the device 10 may include an operation mode, a command mode, and an off mode. To operate in the different modes, instructions are stored in the memory device 32 which when executed by the processor 30 cause the processor 30 to operate the device 10 in the various modes. For example, the device 10 in the operation mode monitors and records what is being written or drawn by the user on the writing surface. The device 10 can be programmed to recognize the writing using handwriting recognition algorithms stored in the memory device 32.

In the command mode, the device 10 monitors the writing of the user and interprets that writing as commands. For example, the user may send previous writings and drawings, such as those monitored and stored in operation mode, by writing "send" followed by parameters for sending. For example, by writing "send 555–1234", the device 10 will send the data via facsimile. In contrast, if "send" is followed by an e-mail address, the data will be sent via e-mail. Of course, separate commands, such as "fax" and "e-mail," may be used to avoid confusion. An "end" command, or any other command defined by the user, may be used to initiate action by the device. For example, the symbol "–>" may be used to end and execute the command. The device may also use other commands, such as "save", "read", "contact", "download", and "phone".

In "off" mode, the device 10 operates as a conventional writing device and does not perform other functions, such as handwriting recognition.

Figure 4:
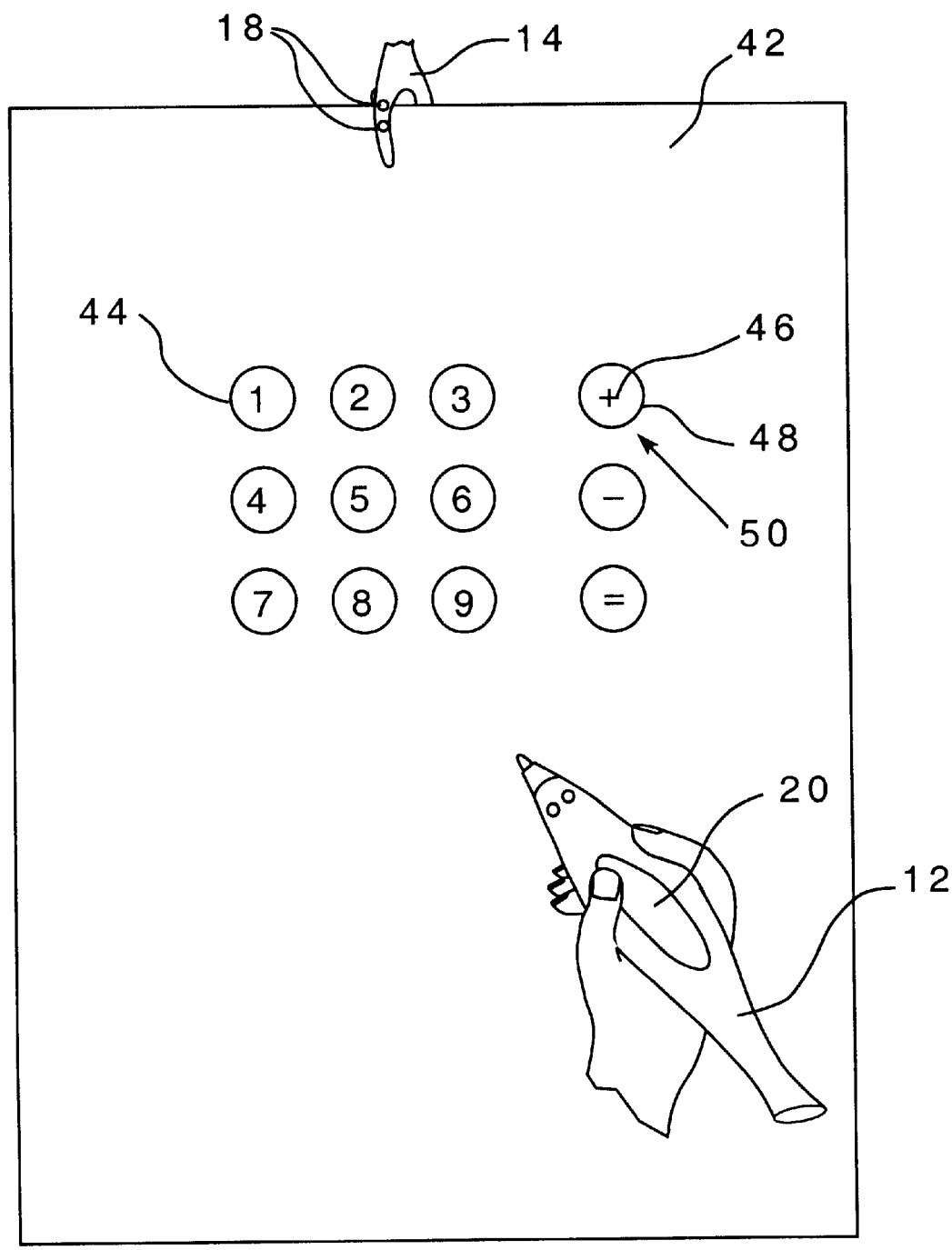
FIG. 4 is a top plan view of the device being used to define a personal interface on a piece of paper.

The device 10 may also be used to define a personal interface. The interface may be used, for example, to enter data into the device 10 or instruct the device 10 to execute specified commands. The interface may be defined by the user as a template including, for example, icons, words, and symbols on a surface, which are drawn with the device 10. For example, the user may enter command mode, write the word "interface", and draw a template of numbers and functions that define a calculator, as illustrated in FIG. 4. The handwriting recognition feature of the device 10 allows it to recognize the numbers and letters, and the device 10 can determine the writing tip's 16 position relative to those drawn numbers and functions. To better define the personal interface, each element, such as each number 44 and each function 46 may be surrounded by a circle or box 48 to more clearly define a command area 50 so that, for example, touching the writing tip 16 inside the command area 50 invokes that element or function, and touching the writing tip 16 outside of the command area 50 does not invoke it. The user may touch the writing tip 16 of the writing instrument 12 to the command area 50, and the device 10 will perform the command indicated by the user. For example, the user may draw a calculator then interact with the drawn interface as though it were a physical calculator. Answers may be provided on the display 20. As a result, a user may balance their checkbook on a piece of scrap paper while waiting at a bus stop. When finished, the user may throw away or recycle the paper.

Other, potentially limitless, interfaces may also be created. For example, the template may be a keyboard, with the keys arranged in any order desired by the user, and the user may interact with the keyboard with the writing tip 16 of the writing, instrument 12. The entries made by the user may be shown on the display 20, and the user may review the results by drawing on the paper 42 up and down arrows, and then touching the arrows.

Figure 5:
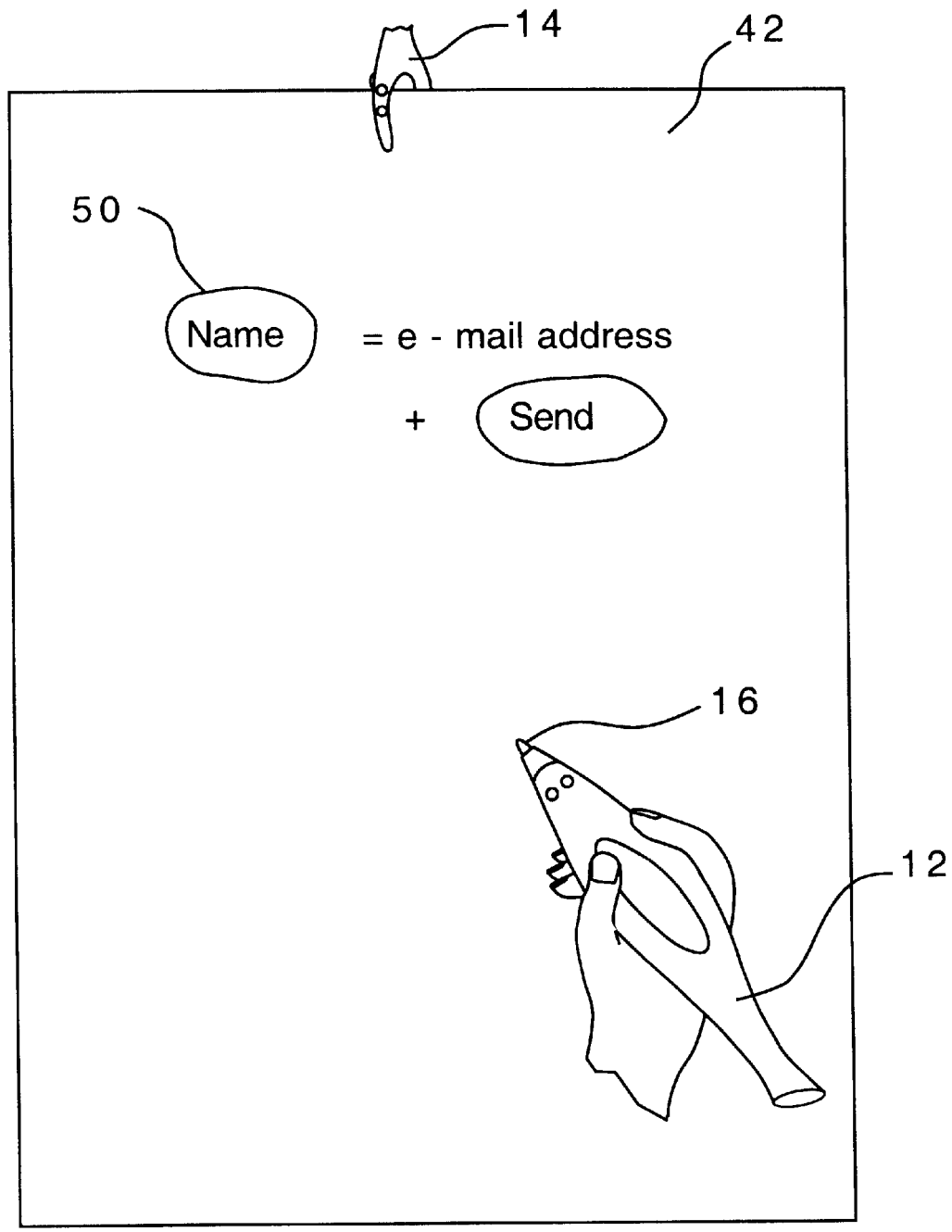
FIG. 5 is a top plan view of the device being used to define an alternative personal interface on a piece of paper.

Also, the interface may be a user-defined macroinstruction. For example, as illustrated in FIG. 5, the user could write the name of a person on the paper and circle it to define a command area 50, and instruct the device 10 that whenever the user touches the writing tip 16 to the command area 50 the device 10 is to transmit stored data to the person's e-mail address. Moreover, the macroinstruction may be stored in the memory device 32 of the device 10, such that it is saved, and will be recognized by the device 10 without the user having to re-define the interface during each subsequent use of the device 10.

Another example of an interface is that the user could write on the paper 42 "FONT=COURIER," circle it, and instruct the device 10 that whenever.the user touches the writing tip 16 to the paper 42 within the circle, the device 10 is to convert information stored in the memory device into ASCII text in courier font.

The various modes may also be used in conjunction. For example, a user could select the operate mode using the input 19, and then write on a piece of paper. In the operate mode the device 10 recognizes the writing, as described hereinbefore. Also, the user could instruct the device 10 to store the writing in the memory device 32 under a particular index or file. Alternatively in the command mode, the user could instruct the device 10 to perform a macroinstruction saved as a user-defined interface, such as to e-mail the writing to a particular address.

Figure 6:
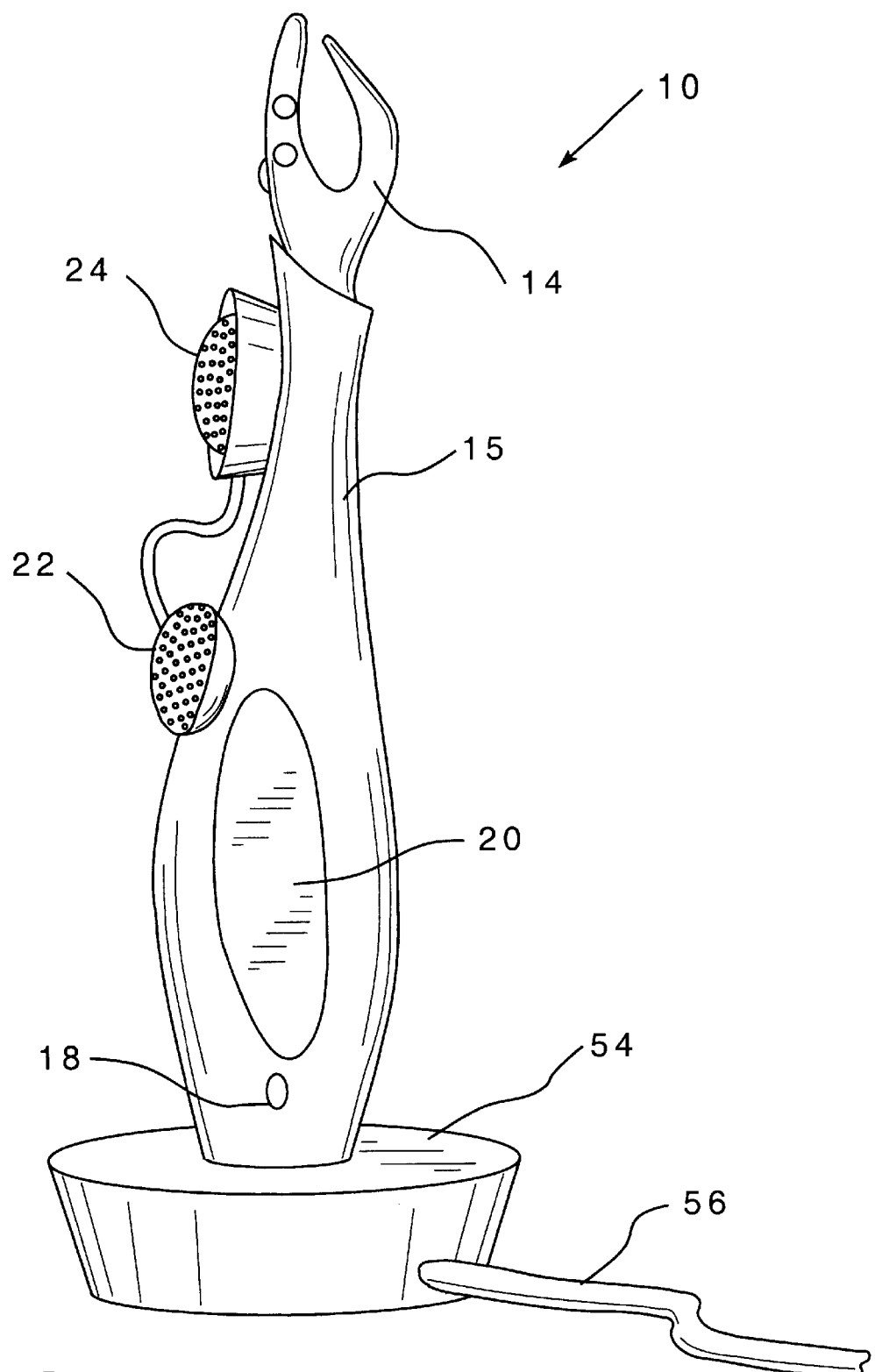
FIG. 6 is a side plan view of the device in a base.

FIG. 6 is a side plan view of the device 10 in a base 54. The base 54 may be used to download data from the device 10 and transmit it to a remote device, such as a personal computer. The base 54 may also charge the power supplies of the device 10. The power supplies for the device 10 may be, for example, an internal rechargeable Lithium-ion solid polymer or liquid gel battery. In addition, the base 54 may be utilized to upload instructions into the memory device 32 of the device 10. A cord 56 on the base 54 may be used to connect the device 10 to a remote device, such as to a computer and/or to a power supply. Alternatively, the base 54 could be wireless.

Figure 7:
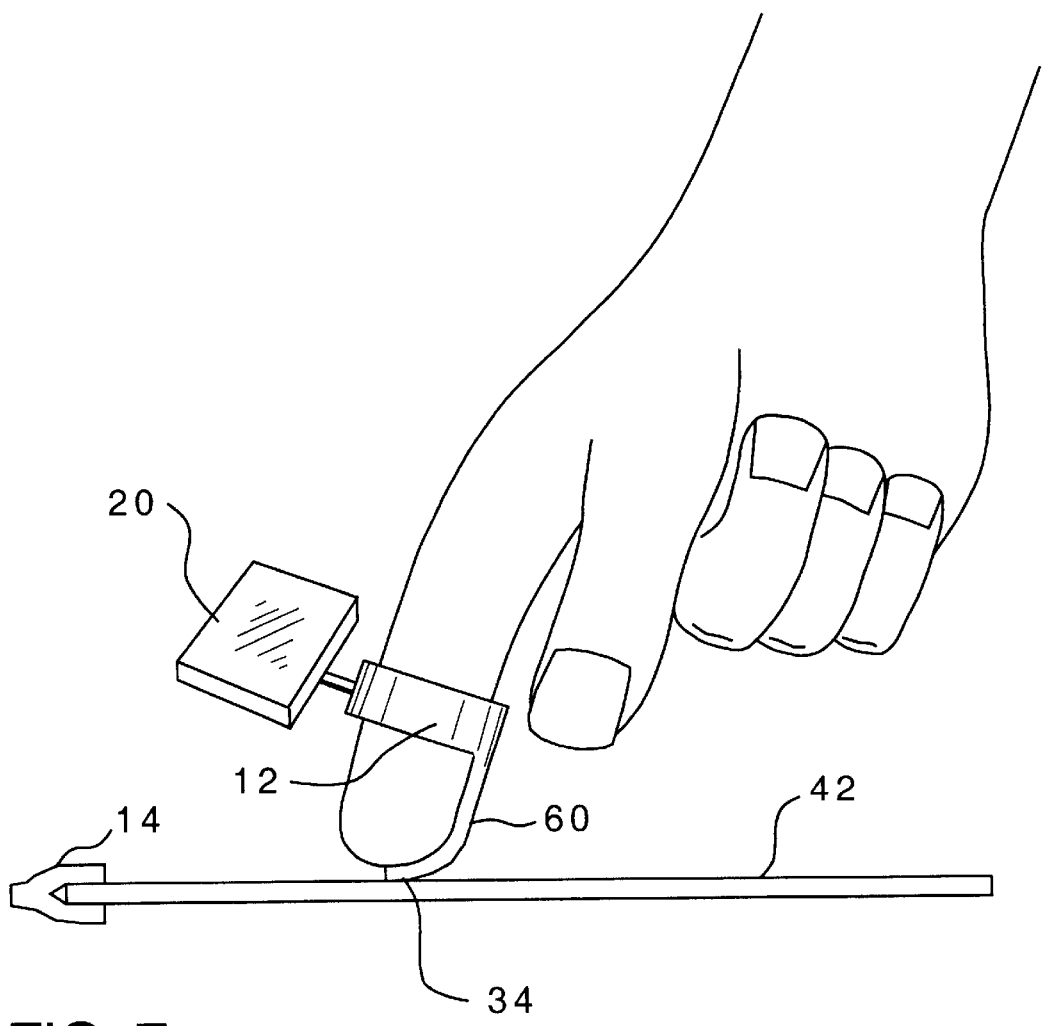
FIG. 7 is a side plan view of an alternative embodiment of the device formed as a ring on a user's finger.

The present invention also includes a method of operating the present invention. The method includes defining and using a personal interface. The interface may be defined with a pen, as described hereinbefore, or it may be defined in other ways. For example, as illustrated in FIG. 7, the invention may be embodied as a ring or sleeve that fits on a user's finger. The writing instrument 12, for example, may be a ring with an extension 60 that engages the paper 42 and houses a pressure sensor 34. A writing surface position indicator 14 may be removably attached to the writing instrument 12 and attached to paper 42 when writing. In that way, the user may write and draw with the finger as if it were the device 10 described hereinbefore. Feedback may be provided to the user by a display 20 mounted on the ring.

Those of ordinary skill in the art will recognize that many modifications and variations of the present invention may be implemented. For example, a user need not define an interface on a writing surface, but could instead define an interface in space, such as by moving the writing instrument 12 similar to waving a baton. A user could distinguish to the device 10 when he is defining the interface and interacting with it from merely moving the writing instrument 12 from point to point, such as by indicating so to the writing instrument 12 by depressing the input 19. The foregoing description and the following claims are intended to cover all such modifications and variations.

What is claimed is:

1. A device comprising:
    a housing;
    a writing tip connected to the housing;
    a processor in the housing;
    a memory device in the housing connected to the processor and having stored thereon instructions which when executed by the processor cause the processor to recognize an interface defined by writing on a writing surface.

2. The device of claim 1, wherein the memory device includes instructions which when executed by the processor cause the processor to recognize user interaction with the interface.

3. The device of claim 2, wherein the memory device includes instructions which when executed by the processor cause the processor to execute commands based on the recognized interaction.

4. The device of claim 1, further comprising a writing surface position indicator removably fastenable to the writing surface and the housing.

5. The device of claim 4, wherein the writing surface position indicator includes a signal transmitter.

6. The device of claim 5, wherein the writing surface position indicator includes a second signal transmitter.

7. The device of claim 5, wherein the writing surface position indicator includes a signal transmitter selected from the group consisting of a active signal transmitter and a passive signal transmitter.

8. The device of claim 5, wherein the writing surface position indicator includes a signal transmitter selected from the group consisting of an infrared signal transmitter, an ultrasonic signal transmitter, and an electromagnetic signal transmitter.

9. The device of claim 1, further comprising a plurality of accelerometers connected to the writing tip.

10. The device of claim 9, further comprising a pressure sensor connected to the writing tip.

11. The device of claim 1, wherein the sensor includes a signal receiver.

12. The device of claim 11, wherein the sensor includes a second signal receiver.

13. The device of claim 1, wherein the memory device further includes instructions stored thereon which when executed by the processor cause the processor to determine relative position between the writing tip and the writing surface.

14. The device of claim 13, wherein:
the sensor periodically receives a signal from the writing surface position indicator; and
the memory device further includes instructions which when executed by the processor cause the processor to periodically update the relative position between the writing tip and the writing surface.

15. The device of claim 1, wherein the memory device further includes instructions which when executed by the processor cause the processor to recognize data written with the writing tip on the writing surface.

16. The device of claim 15, wherein the memory device further includes instructions which when executed by the processor cause the processor to execute commands in response to the recognized data.

17. The device of claim 15, wherein the memory device further includes instructions which when executed by the processor cause the processor to recognize a user-defined interface defined by the recognized data.

18. The device of claim 1, further comprising a base connected to the housing.

19. A method for defining an interface, comprising:
monitoring movement of a writing instrument on a writing surface;
recognizing a command area on the writing surface defined by movement of the writing instrument;
associating a command with the command area; and
determining whether the writing instrument touches the writing surface within the command area.

20. The method of claim 19, further comprising executing the command if the writing instrument touches the writing surface within the command area.

21. The method of claim 20, wherein monitoring movement of the writing instrument includes:
periodically producing a signal from a fixed location relative to the writing surface;
receiving the signal at the writing instrument; and
updating a position of the writing instrument relative to the fixed location.

22. The method of claim 19, further comprising periodically producing a signal from a fixed location relative to the writing surface.

23. The method of claim 22, wherein producing a signal is selected from the group consisting of producing an infrared signal, producing an ultrasonic signal, and producing an electromagnetic signal.

24. The method of claim 22, wherein producing a signal is selected from the group consisting of producing an active signal and producing a passive signal.

25. The method of claim 22, wherein determining the relative position includes determining the relative position by triangulation.

26. The method of claim 22, further comprising producing a second signal from a second fixed location relative to the surface, wherein the fixed location and the second fixed location are spaced apart by a distance.

27. The method of claim 19, further comprising determining movement of the writing instrument on the writing surface.

28. The method of claim 19, further comprising updating a position of the writing instrument relative to the writing surface.

29. A device, comprising:
a housing;
a writing tip connected to the housing;
a writing surface position indicator;
a plurality of accelerometers connected to the housing;
a pressure sensor connected to the writing tip;
a processor in the housing;
a memory device in the housing connected to the processor and having stored thereon instructions which when executed by the processor cause the processor to recognize an interface defined by writing on a writing surface; and
a sensor in the housing and cooperative with the writing surface position indicator.

30. The device of claim 29, wherein the memory device further includes instructions which when executed by the processor cause the processor to recognize user interaction with the interface.

31. The device of claim 30, wherein the memory device further includes instructions which when executed by the processor cause the processor to execute commands based on the recognized interaction.

* * * * *

UNITED STATES PATENT AND TRADEMARK OFFICE
CERTIFICATE OF CORRECTION

PATENT NO. : 6,628,847 B1
DATED : September 30, 2003
INVENTOR(S) : Kasabach et al.

It is certified that error appears in the above-identified patent and that said Letters Patent is hereby corrected as shown below:

Column 3,
Line 12, delete "Writing" and insert -- writing -- therefor.

Column 6,
Line 32, after "relative" insert -- to the writing surface position indicator 14 by, for example, triangulation. The device 10 then --.

Column 7,
Line 47, delete "writing,instrument" and insert -- writing instrument -- therefor.
Line 64, delete "whenever.the" and insert -- whenever the -- therefor.

Column 8,
Line 4, after "mode" insert -- , --.

Signed and Sealed this

Third Day of May, 2005

JON W. DUDAS
*Director of the United States Patent and Trademark Office*